United States Patent
Wang et al.

(10) Patent No.: US 9,367,766 B2
(45) Date of Patent: Jun. 14, 2016

(54) TEXT LINE DETECTION IN IMAGES

(71) Applicant: Adobe Systems Incorporated, San Jose, CA (US)

(72) Inventors: Jue Wang, Kenmore, WA (US); Jianchao Yang, San Jose, CA (US); Zhe Lin, Fremont, CA (US); Ke Ma, Guangzhou (CN)

(73) Assignee: Adobe Systems Incorporated, San Jose, CA (US)

( * ) Notice: Subject to any disclaimer, the term of this patent is extended or adjusted under 35 U.S.C. 154(b) by 37 days.

(21) Appl. No.: 14/338,216

(22) Filed: Jul. 22, 2014

(65) Prior Publication Data

US 2016/0026899 A1    Jan. 28, 2016

(51) Int. Cl.
*G06K 9/34* (2006.01)
*G06K 9/62* (2006.01)
*G06K 9/72* (2006.01)
*G06T 7/00* (2006.01)
*G06K 9/00* (2006.01)
*H04N 1/00* (2006.01)

(52) U.S. Cl.
CPC .......... *G06K 9/6261* (2013.01); *G06K 9/00442* (2013.01); *G06K 9/00463* (2013.01); *G06K 9/72* (2013.01); *G06T 7/0081* (2013.01); *H04N 1/00331* (2013.01); *G06K 9/00449* (2013.01)

(58) Field of Classification Search
CPC .......... G06K 9/00442; G06K 9/00463; G06K 9/6261; G06K 9/72; G06K 9/00449; G06T 7/0081; H04N 1/00331
USPC .................................................. 382/176–177
See application file for complete search history.

(56) References Cited

U.S. PATENT DOCUMENTS

| | | | | |
|---|---|---|---|---|
| 5,848,184 A * | 12/1998 | Taylor | ............... | G06K 9/00463 382/173 |
| 7,570,816 B2 * | 8/2009 | Bargeron | ............. | G06K 9/6256 382/176 |
| 7,576,753 B2 * | 8/2009 | Saund | ............... | G06K 9/00463 345/441 |
| 8,548,246 B2 * | 10/2013 | Al-Omari | .......... | G06K 9/00463 358/474 |
| 2003/0142112 A1 * | 7/2003 | Saund | ............... | G06K 9/00463 345/619 |
| 2008/0002893 A1 * | 1/2008 | Vincent | ............... | G06K 9/3258 382/229 |
| 2009/0285482 A1 * | 11/2009 | Epshtein | ............. | G06K 9/3258 382/176 |

OTHER PUBLICATIONS

Bissacco, et al., "PhotoOCR: Reading text in uncontrolled conditions", IEEE Intl Conference on Computer Vision (CCV), Dec. 1-8, 2013, 785-792.

(Continued)

*Primary Examiner* — Kanjibhai Patel
(74) *Attorney, Agent, or Firm* — Kilpatrick Townsend & Stockton LLP

(57) ABSTRACT

Techniques for detecting and recognizing text may be provided. For example, an image may be analyzed to detect and recognize text therein. The analysis may involve detecting text components in the image. For example, multiple color spaces and multiple-stage filtering may be applied to detect the text components. Further, the analysis may involve extracting text lines based on the text components. For example, global information about the text components can be analyzed to generate best-fitting text lines. The analysis may also involve pruning and splitting the text lines to generate bounding boxes around groups of text components. Text recognition may be applied to the bounding boxes to recognize text therein.

19 Claims, 10 Drawing Sheets
(2 of 10 Drawing Sheet(s) Filed in Color)

(56) References Cited

OTHER PUBLICATIONS

Bosch, et al., "Image classification using random forests and ferns", 11th IEEE Intl Conference on Computer Vision (ICCV), Oct. 14-21, 2007, 1-8.

Dalal, et al., "Histograms of oriented gradients for human detection", IEEE Computer Society Conference on Computer Vision and Pattern Recognition. Jun. 25, 2005, 886-893.

Delong, et al., "Fast approximate enemy minimization with label costs", Computer Vision and Pattern Recognition (CVPR). Jun. 2010, 8 pages.

Epshtein, et al., "Detecting text in natural scenes with stroke width transform", IEEE Intl Conference on Computer Vision and Pattern Recognition (ICCV), Jun. 13-18, 2010, 2963-2970.

Forssen, "Maximally stable colour regions for recognition and matching", IEEE Intl Conference on Computer Vision and Pattern Recognition, Jun. 17-22, 2007, 1-8.

Huang, et al., "Text localization in natural images using stroke feature transform and text covariance descriptors", IEEE Intl Conference on Computer Vision (ICCV), Dec. 1-8, 2013, 1241-1248.

Isack, et al., "Energy-based geometric multi-model fitting", Intl Journal of Computer Vision, Apr. 2012, 97(2); '123-147.

Karatzas, et al., "Robust Reading Competition", 12th Intl Conference on Document Analysis and Recognition (ICDAR), Aug. 25-28, 2013, 1484-1493.

Matas, et al., "Robust wide baseline stereo from maximally stable extremal regions", BMVC, 2002, 384-393.

Mishra, et al., "Top-down and bottom-up cues for scene text recognition", IEEE Conference on Computer Vision and Pattern Recognition (CVPR), Jun. 16-21, 2012, 2687-2694.

Neumann, et al., "On combining multiple segmentations in scene text recogniton", International Conference on Document Analysis and Recognition (ICDAR), 2013, 5 pages.

Neumann, et al., "Real-time scene text localization and recognition", 25th IEEE Conference on Computer Vision and Pattern Recognition, Jun. 15-21, 2012, 8 pages.

Pan, et al., "A hybrid approach to detect and locallze texts in natural scene images", IEEE Transactions on Image Processing, Mar. 2011, 20(3) 800-813.

Shahab, et al., "Robust Reading Competition Challenge 2: Reading text in scene images", Conference on Document Analysis and Recognition (ICDAR), Sep. 18-21, 2011, 1491-1496.

Shi, et al., "Scene text recognition using part-based tree-structured character detection", IEEE Conference on Computer Vision and Pattern Recognition (CVPR), Jun. 23-28, 2013, 2961-2968, Vedaldi, et al., "VLFeat —An open and portable library of computer vision algorithms", MM'10, Oct. 25-29, 2010, 4 pages.

Viola, et al., "Robust real-time face detection", Intl Journal of Computer Vision, 2004, 57(2) 137-154.

Wang, et al., "End-to-end scene text recognitlon", IEEE Intl Conference on Computer Vision (CCV), Nov. 6-13, 2011, 1457-1464.

Wolf, et al., "Object count/area graphs for the evaluation of object detection and segmentation algorithms", Technical Reports LIRIS, Sep. 28, 2005, 28 pages.

Yin, et al., "Robust text detection in natural scene images", IEEE Transactions on Pattern Analysis and Machine Intelligence, May 2014, 36(5) 970-983.

\* cited by examiner

TEXT LINE DETECTION IN IMAGES

TECHNICAL FIELD

This disclosure relates generally to techniques for detecting and recognizing text lines.

BACKGROUND

Detecting and recognizing text lines in natural images is an important component in content-based retrieval, and has many real-world applications such as mobile search, text translation, and image tagging. For example, a user may capture an image of a product using his or her smartphone. A search application executing on the smartphone may use the image to identify a text line across a label of the product, recognize text from the text line, use the text to conduct an online search for information about the product, and display search results to the user.

Compared to extracting text in well-captured document images, spotting text elements in natural scenes is much more challenging due to the huge amount of diversity in both text appearance and surrounding backgrounds. For example, text lines in natural images could be in any orientation and could vary dramatically in font, size, and color across images. Images captured by hand-held devices also suffer from non-uniform illumination, occlusion, and blur. Moreover, text-like background objects such as windows, bricks, and fences may confuse a text detector.

Previous text detection techniques roughly follow the same bottom-up paradigm of two main steps. In a first step, pixel-level features are extracted to group pixels into text components. In a second step, sufficiently similar nearby text components are grouped into text lines. These techniques heavily focus on the first step by exploring various low-level image features and both rule-based and learning-based component forming and filtering techniques.

The second step of text line extraction has been a less explored territory. For this step, previous techniques often use heuristic, greedy methods by concatenating neighboring text components that are similar to form chain structures to represent text line candidates. Most commonly, a text component is set as a seed and compared to a neighboring text component. If sufficiently similar, the two text components are chained together to start a text line. This process is repeated for the next neighboring text components, until a large enough dissimilarity is encountered. At that point, the chain is broken to mark the end of the text line. However, such methods can be inaccurate and can fail due to, for example, local component detection errors. In theory, accurate component detection in the first step may result in good text line extraction in the second step. In practice, however, component detection typically includes errors. Further, simple text line construction methods as in the previous techniques do not handle errors in the input data well, resulting in inaccurate output.

In another approach for text line extraction, previous techniques have also used a graph-based text line approach. In this approach, a graph based on the detected components is generated. Graph segmentation methods are used to cut the graph to produce text lines. However, these approaches are also sensitive to the errors in the component detection step, since the errors directly affect the vertices and edges of the constructed graph.

SUMMARY

One exemplary embodiment involves receiving an image. For example, a request may be received, along with an image, to detect and recognize text in the image. The exemplary embodiment also involves detecting text components in the image. For example, the image can be analyzed using multiple color spaces and a multi-stage filter to detect the text components. Additionally, the exemplary embodiment involves generating lines between pairs of the text components. For example, pairs of text components that meet certain constraints may be considered and lines can be drawn between the centers, or some other points, of the text components. Further, the exemplary embodiment involves matching one of the lines with a set of the text components based on features of the text components and based on a total number of matched lines. For example, geometric and color features of a line may be compared to features of text components. If a good match is found and if matching the line to these text components reduces the total number of matched lines, the line can be uniquely matched to these text components. Finally, the exemplary embodiment involves recognizing text from the set of the text components based on the matched line. For example, the matched line can be broken into segments that correspond to groups of text components. Each group can represent a word. An optical character recognition (OCR) algorithm can be applied to each segment to recognize the corresponding text.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

BRIEF DESCRIPTION OF THE FIGURES

The patent or application file contains at least one drawing executed in color. Copies of this patent or patent application publication with color drawings will be provided by the office upon request and payment of any necessary fee.

These and other features, embodiments, and advantages of the present disclosure are better understood when the following Detailed Description is read with reference to the accompanying drawings.

DETAILED DESCRIPTION

Figure 1:
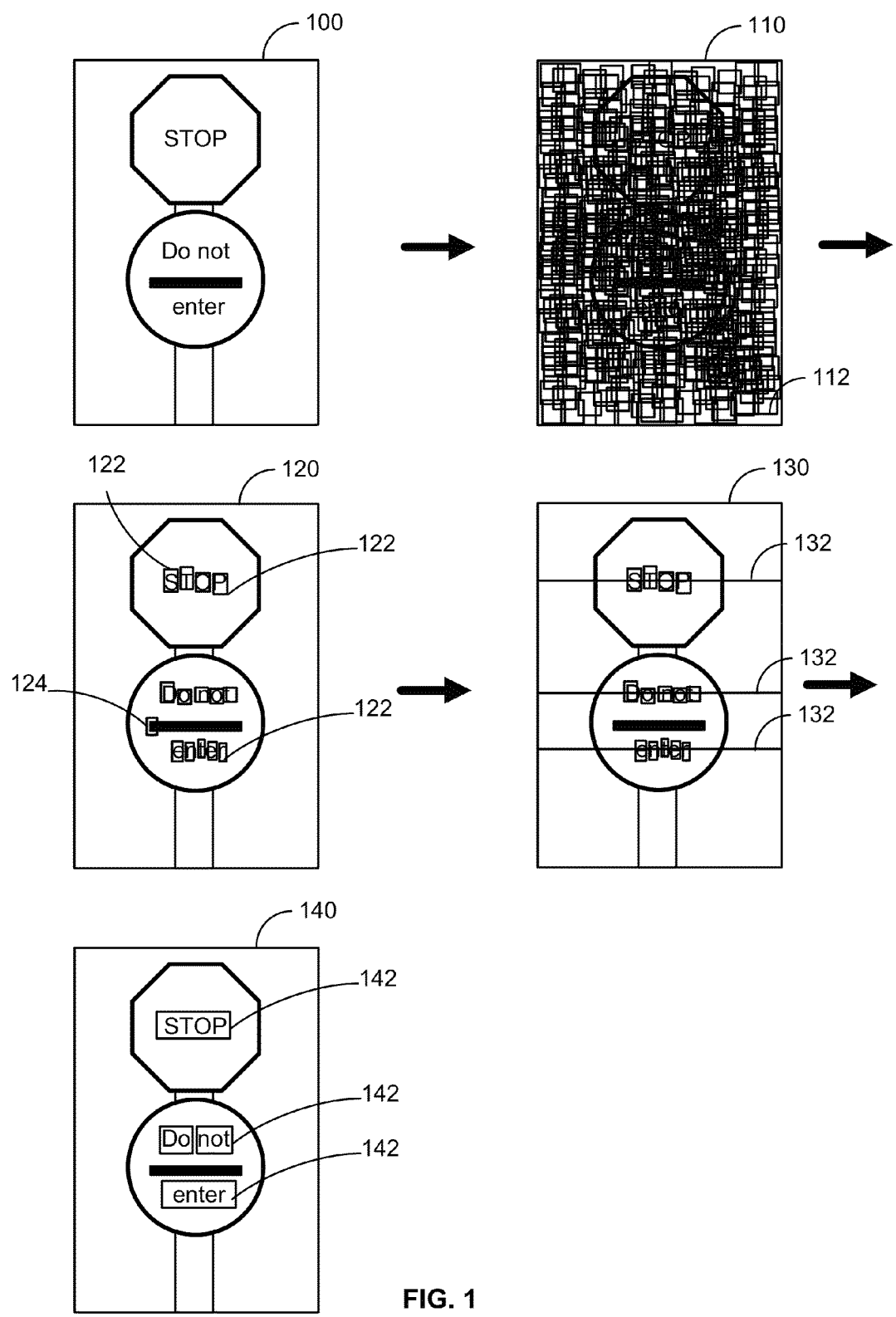
FIG. 1 illustrates an example of detecting and recognizing text in an image, according to certain embodiments of the present invention.

Specific details of various exemplary embodiments of the present invention are set forth in the following description and are illustrated in FIGS. 1-10. The various embodiments described herein can be implemented in hardware, software, or a combination thereof. In the figures, similar symbols may identify similar components, unless context dictates otherwise. Certain well-known technology details, such as methods, apparatus, or systems that would be known by one of ordinary skill, are not set forth in the following description or in the figures to avoid unnecessarily obscuring the various examples. Those of ordinary skill in the relevant art will understand that they can practice other examples of the disclosed subject matter without departing from the scope and spirit of the present invention.

Generally, the embodiments described herein are directed to, among other things, detecting and recognizing text. Specifically, disclosed are methods, systems, and computer readable media that embody techniques for analyzing an image to identify text. The embodied techniques include a process for extracting text lines from text components. Unlike previous techniques, the process can be resilient to errors in component detection, can extract accurate text lines even from relatively low quality component detection, and can detect text lines in various orientations. In particular, the process considers features of text components globally or across an entire image to extract the text lines rather than limiting the line extraction to local information.

In an embodiment, the process initially generates all possible combinations of text lines and text components. For example, the process can generate text lines between pairs of text components that meet certain constraints. Each of the text lines can be characterized using features of intersecting text components. As such, there may initially be a large number of text lines across the image. Further, each text component can belong to one or more text lines. Next, the process searches and selects the best-fitting text lines out of all the possible combinations. One approach involves treating this selection as an optimization solution that considers information about the generated text lines and about the text components across the entire image to find the best-fitting text lines. For example, the process can iteratively match text lines to text components based on similarities of the associated features such that, at the end, each text component belongs to one line and each text line includes the most similar text components. Text lines that do not include any matched text components can be removed. As such, out of all the possible combinations, the process extracts the text lines that best fit the text components.

In an embodiment, another process for detecting text components provides output to the above process for extracting text lines. In an embodiment, an image is represented in multiple color spaces to detect various regions. For example, the image can be represented in grayscale and color gradient magnitude color spaces. The regions are then filtered using a multi-stage filter. In each stage, the regions are filtered using a different set of features to filter out non-text components. The output of the multi-stage filter includes regions that likely include text components. These regions can be inputted as text components to the process of text line extraction.

In an embodiment, a third process for recognizing text from a text line is used. Extracted text lines can be inputted to this process to recognize the associated text. In one example, a start and an end of a text line are identified based on intersecting text components. Each of the text components can represent a letter, a character, a portion of a word, or the like and belonging to the text line. Gaps between these text components may be computed. The respective sizes of the gaps between text components may be used to group a subset of the text components into a group, e.g., text components comprising letters may be grouped into words. An optical character recognition (OCR) algorithm is implemented to recognize text from the grouped text components.

Figure 8:
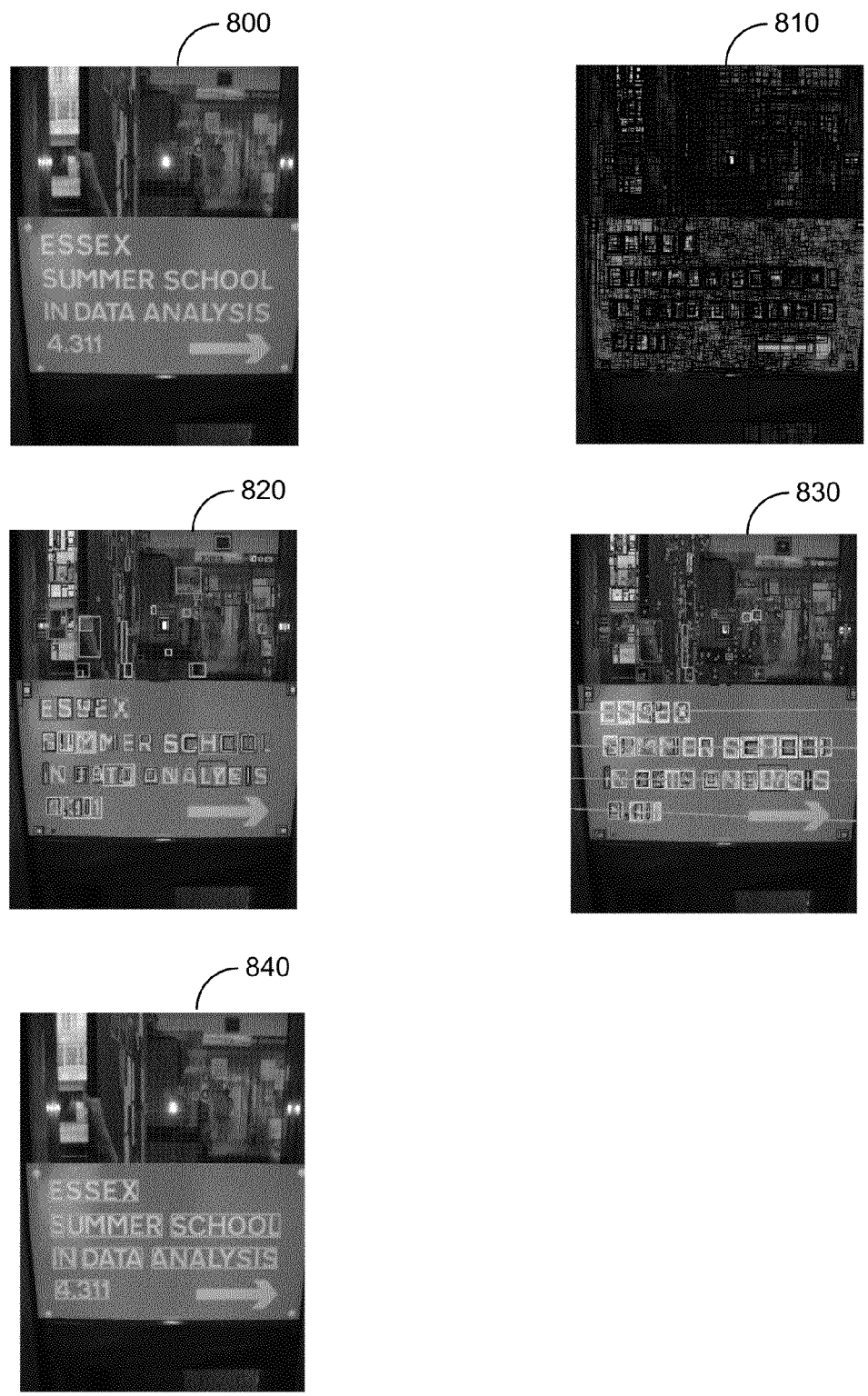
FIG. 8 illustrates an example image as processed, according to certain embodiments of the present invention.
Figure 9:
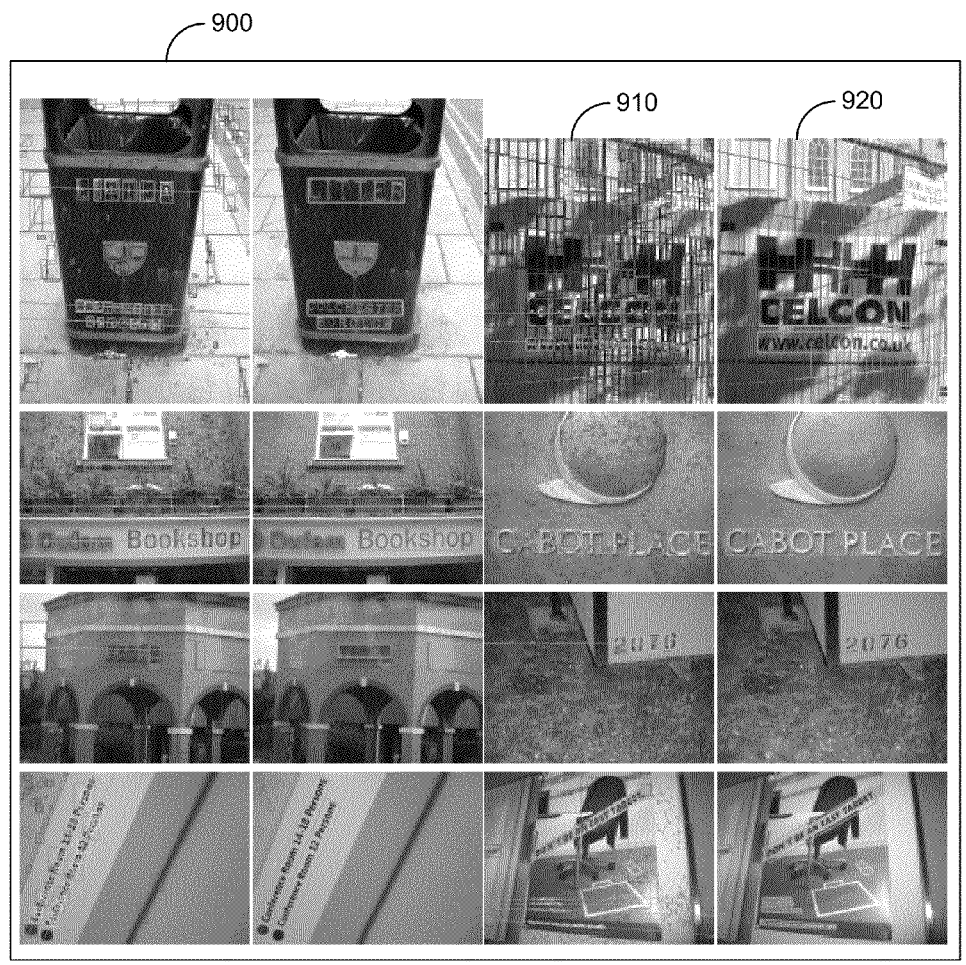
FIG. 9 illustrates example text lines and recognized text in images, according to certain embodiments of the present invention.
Figure 10:
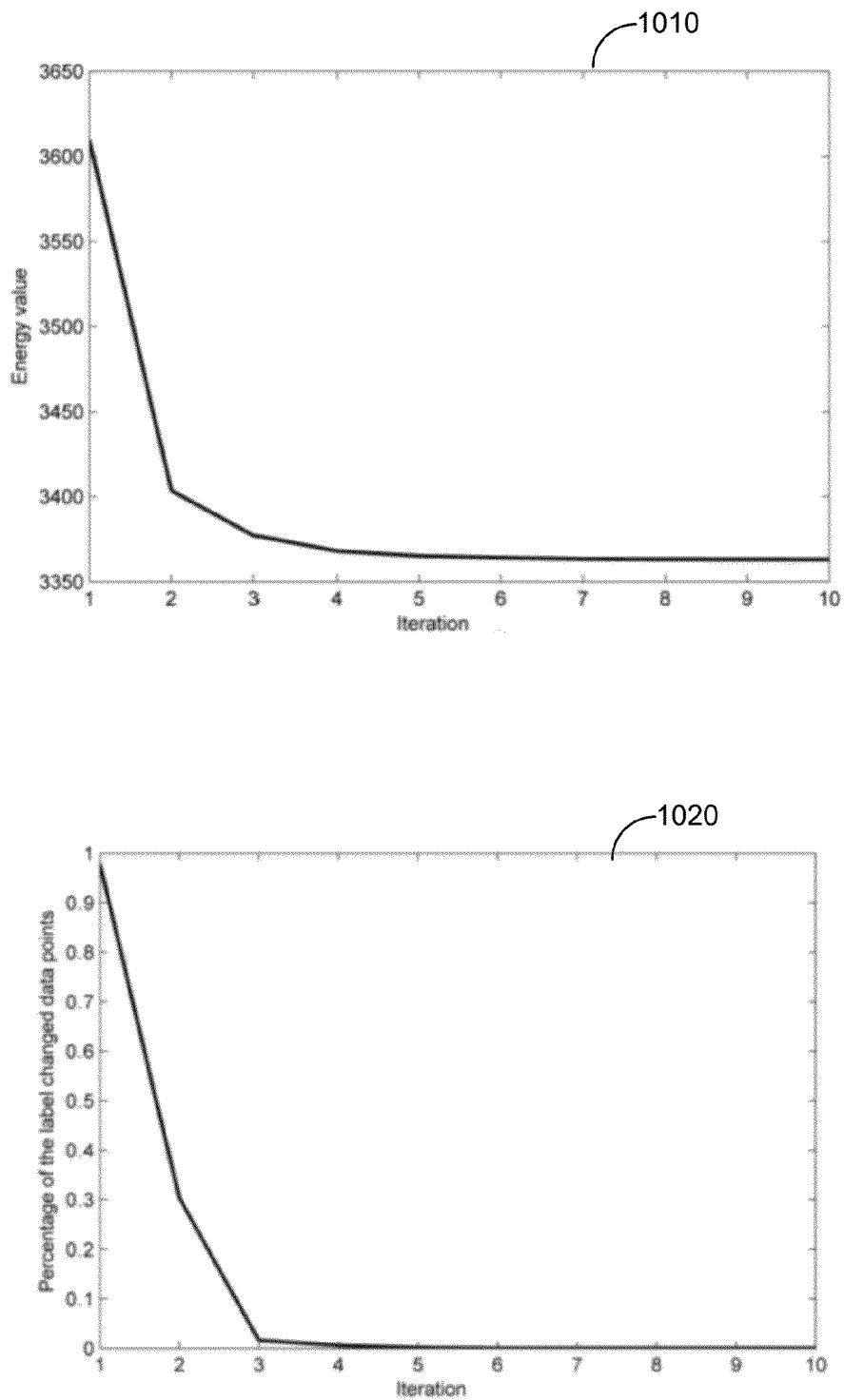
FIG. 10 illustrates an example of a number of iterations used for detecting text lines, according to certain embodiments of the present invention.

By using one or more of the above three processes, the accuracy of detecting and recognizing text in images can surpass accuracies of previous techniques. As further described in association with FIGS. 8-10, the accuracy can be measured using a dataset of images provided by the International Conference on Document Analysis and Recognition (ICDAR) 2011 and 2013. As shown in FIGS. 8-10, the accuracy of the three combined processes is the highest measured accuracy relative to the previous techniques.

Turning to FIG. 1, that figure illustrates an example image and application of the above processes to the image. As illustrated, an image 100 may include various text components at various locations of the image 100 (shown as "STOP," "Do not," and "enter"). Generally, the image 100 may represent a scene with foregrounds, backgrounds, and text. Each of these elements can have different appearances that can vary within the image 100. For example, the text can be in any orientation and can vary in font, size, and color. The image 100 can be captured by a computing device. The computing device can be of any type of computing devices configured to capture images including, for example, a mobile phone with an integrated camera, an amateur camera, a professional camera, and other types of computing devices. In some situations, the image 100 can suffer from non-uniform illumination, occlusion, and blur based on capabilities of the used computing device and conditions associated with capturing the image 100.

However, an "image" as used herein may not be limited to an image captured by a computing device. Instead, an image may include any image for which text detection and recognition may be applied. In an example, an image may be an image inserted in a document or saved in a file, regardless of how that image may have been generated. In another example, an image may include a scanned document or any document for which document structure information may not be available. Such documents can be subjected to an OCR algorithm for recognizing text therein.

A text detection process may be applied to the image 100. The text detection process can be similar to the one described herein above. Example embodiments of the text detection process are further illustrated in FIGS. 2 and 3. Briefly, in a first step, the image 100 can be segmented into regions 112. The regions 112 can be overlaid over the image 100 to produce an image 110. A region may be classified as a text region or as a non-text region. A text region includes a text component at a certain confidence level (e.g., likelihood). A text component can represent a portion of a text, such as a portion of a character, multiple characters, a word, multiple words, or other text portions. On the other hand, a non-text region excludes a text component also at a certain confidence level. More generally, a region can be defined or characterized with a set of features. The features can include geometric attributes of the region (e.g., coordinate points relative to a coordinate system of the image 100, width and height, corner points, area, stroke width, or other geometric attributes). The features can also include information about the region from color spaces (e.g., color value, color variance, color density, or other color-related information) and an indication of the confidence level.

In a second step, filters can be applied to the regions 112 to filter-out the non-text regions. This filtering results in an image 120 that includes only text regions 122. The image 120 may include some false positives (e.g., a region classified as including text when in fact it does not include text and should have been classified as a non-text region). There may be also some false negatives (e.g., a region classified as a non-text region when in fact it includes text and should have been classified as a text region). Further, there may be some outlier text regions. An outlier text region may represent a text region that may be at a distance away from other text regions and can be considered as not having neighboring text regions within a certain radius. As illustrated, a text region 124 represents a false positive (e.g., as it does not include a text component) and an outlier (e.g., as it has no neighboring text regions within a certain radius).

The image 120 may be provided as input to a text line extraction process. The text line extraction process can be similar to the one described herein above. Example embodiments of this process are further illustrated in FIGS. 2 and 4. Briefly, in response to inputting the image 120, the process analyzes the text regions 122 and outputs an image 130 that includes text lines 132 and excludes some or all of the false positives and outliers (e.g., the outlier 124). A text line may represent a straight line that runs across the image and that intersects a plurality of text components. As further described in FIG. 4, a text line can be defined or characterized with a number of features. These features can include geometric attributes of the text line (e.g., slope, coordinate intercepts, or other geometric attributes). The features can also include features of the intersecting components as described herein above. The outputted text lines 132 can represent the best-fitting lines from all possible combinations of text lines and text regions (including the text regions 122 and the outlier text regions 124). To illustrate, the process may generate a text line connecting the text region that includes the letter "S" (e.g., the "S region") and the text region that include the letter "T" (e.g., the "T region"). The process can also generate another text line connecting the S region and the text region that includes the letter "D" (e.g., the "D region"). Based on analyzing information about the different text regions 122 across the image 120, the process may determine that the best-fitting text line intersecting the S region is the first text line and may delete the other text line. Further, as illustrated, the process may determine that the outlier 124 may not match well with any of the text lines and thus may not include an intersecting text line for the outlier 124.

The image 130 can be provided as an input to a text recognition process. The text recognition process can be similar to the one described herein above. Example embodiments of this process are further illustrated in FIGS. 2 and 6. Briefly, in response to inputting the image 130, the process analyzes the text lines 132 and outputs text 142. For example, the process can identify text regions 122 that belong to a text line 132 (e.g., the S, T, O, and P text regions belonging to a same text line). The process can determine a start and an end of the text line 132 based on these text regions. This step of the process may be referred to as pruning the text line 132. The process can also analyze gaps between the text regions 122 to determine whether the text line 132 should be broken into multiple segments corresponding to groups of text regions. This step of the process may be referred to as splitting the text lines 132.

As illustrated, the top text line intersecting the S, T, O, and P regions can be pruned as starting at the S region and ending at the P region. No additional trimming may be needed as the gaps between the text regions indicate that these text regions belong to a same group. By applying an OCR algorithm to the group of text regions, the word "STOP" can be recognized.

Turning to FIGS. 2-4 and 6, those figures illustrate example flows for detecting and recognizing text. In the illustrative operations, each of the operations or functions may be embodied in, and fully or partially automated by, modules executed by one or more processors of a computing device. An example device is further illustrated in FIG. 7. Additionally, while the operations are illustrated in a particular order, it should be understood that no particular order is necessary and that one or more operations may be omitted, skipped, and/or reordered. In the interest of clarity of explanation, a computing device is described as performing the illustrative operations. Nevertheless, one of ordinary skill in the art would appreciate the computing device can execute one more modules to implement one or more of the operations and/or one or more steps of the operations.

Figure 2:
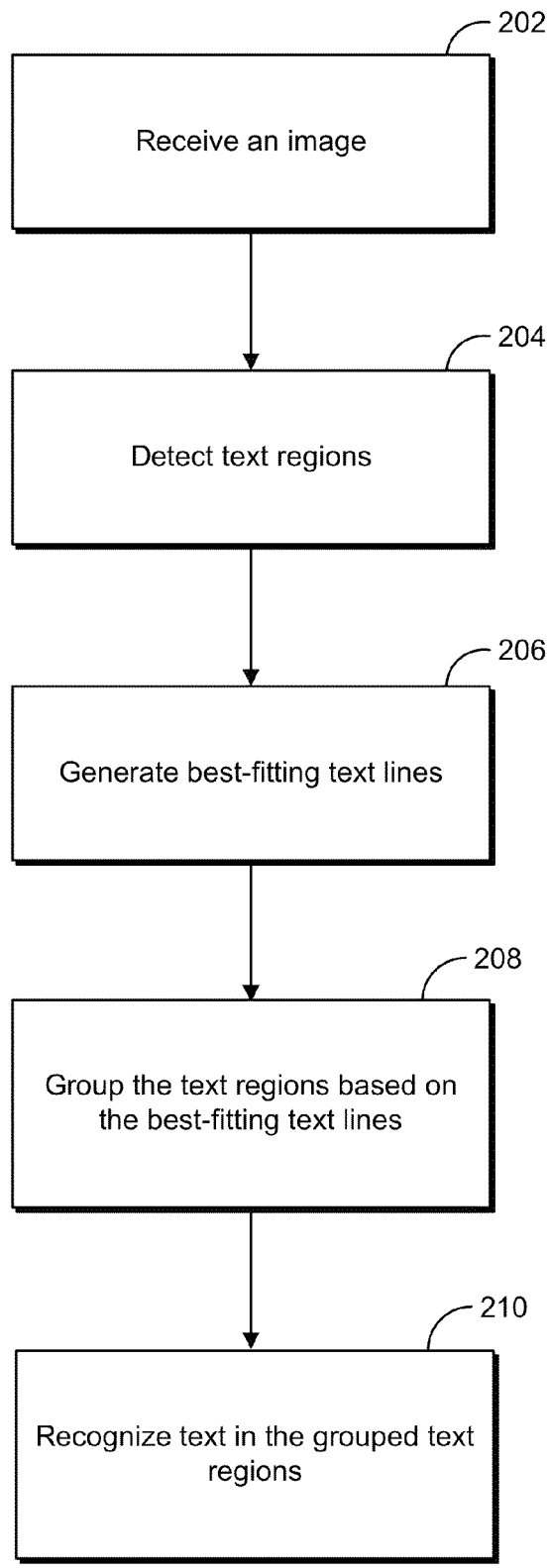
FIG. 2 illustrates an example flow for detecting and recognizing text in an image, according to certain embodiments of the present invention.
Figure 3:
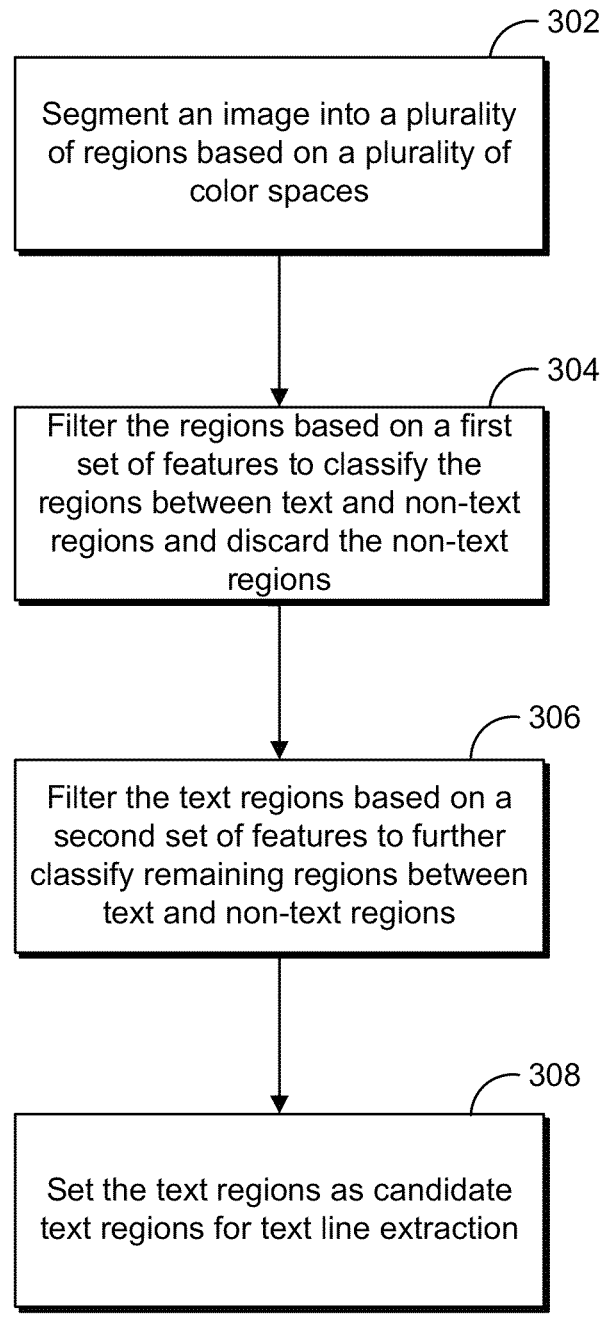
FIG. 3 illustrates an example flow for detecting candidate text regions in an image, according to certain embodiments of the present invention.
Figure 4:
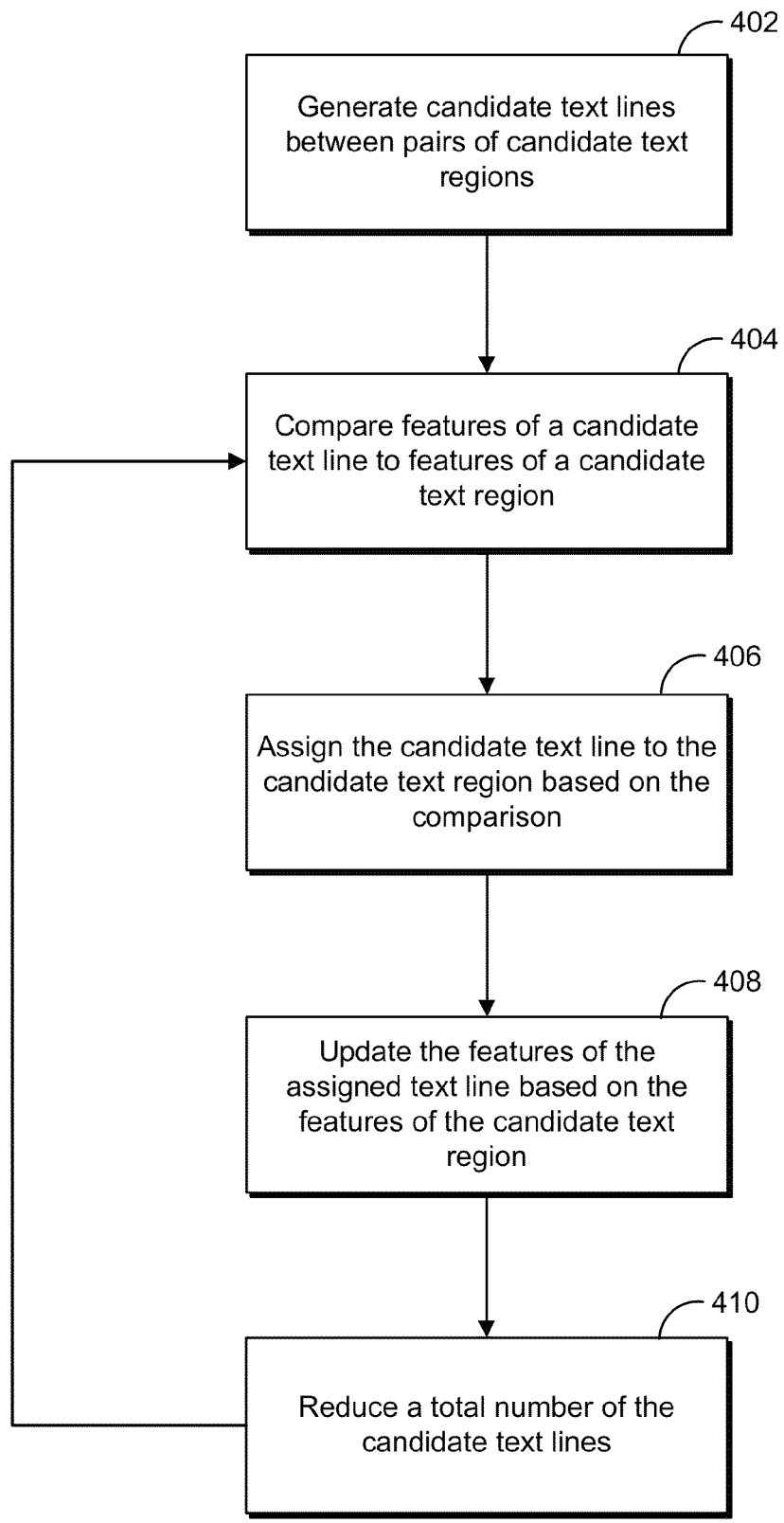
FIG. 4 illustrates an example flow for detecting text lines based on candidate text regions, according to certain embodiments of the present invention.
Figure 6:
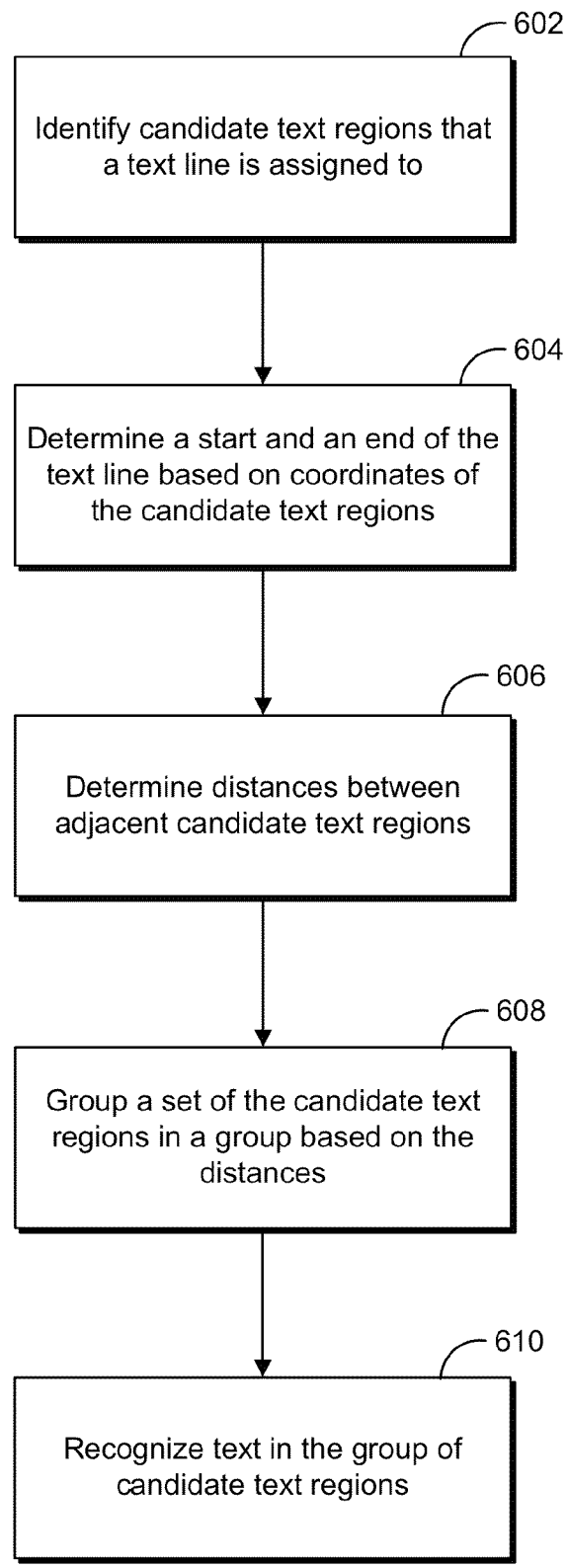
FIG. 6 illustrates an example flow for recognizing text based on a text line, according to certain embodiments of the present invention.

FIG. 2 illustrates an example overall flow for detecting and recognizing text in an image. Operations of the example flow of FIG. 2 may be further embodied in operations of example flows of FIGS. 3-4 and 6. As such, some operations of the example flows of FIGS. 2-4 and 6 may be similar. Such similarities are not repeated herein in the interest of clarity of explanation. FIG. 3 illustrates an example flow for detecting text components in an image. In comparison, FIG. 4 illustrates an example flow for extracting text lines from text components and FIG. 6 illustrates an example flow for recognizing text from text lines.

Turning to FIG. 2, the example flow starts at operation 202, where a computing device receives an image. That image may have been captured by the computing device or may have been received from another computing device over a network. Further and as described herein above, in an embodiment, the image includes a document for which text recognition is desired.

At operation 204, the computing device detects text regions. This operation can include considering low-level pixel information of the image to extract various features, such as color, color consistency, stroke width, or other features and to group the pixels in text components accordingly. In an embodiment, the computing device generates representations of the image in multiple color spaces, analyzes the representations, determines regions, and classifies the regions into text and non-text regions. The text regions may be characterized with features that include geometric information, color space information, and a confidence level indication.

At operation 206, the computing device generates best-fitting text lines. Each of the best-fitting text lines may intersect multiple text regions, but each text region may belong to only one text line. To do so, the computing device can initially generate all possible text lines by drawing lines between pairs of text regions that meet certain constraints. These text lines may be referred to as candidate text lines. Features of a candidate text lines are set to include features of the corresponding pair of text regions and of any additional intersecting text component. Some of the candidate text lines may be the best-fitting lines, while the remaining candidate text lines may not and may be removed. Further, each text region may belong to one or more candidate text lines. Next, the computing device searches for the best-fitting text lines from the candidate text lines. To do so, the computing device matches the candidate text lines and the text regions using an optimization approach. This approach can iteratively minimize the differences between features of each matched text line and features of the associated text regions, while also minimizing the total number of matched lines. Candidate text lines for which no text region are matched can be removed. Candidate text lines that are matched to text regions are set as the best-fitting text lines.

At operation 208, the computing device groups the text regions based on the best-fitting text lines. In an embodiment, the computing device can prune and split each text line based on the text regions that the text line intersects. This can involve analyzing the geometric attributes of the text regions to determine gaps. If a gap between two adjacent text regions is smaller than a threshold, these two text regions belong to a same group; otherwise, the two text regions belong to different groups.

At operation 210, the computing device recognizes text in the grouped text regions. For example, the computing device can apply an OCR algorithm to each group to determine the associated text.

Turning to FIG. 3, that figure illustrates a more detailed flow for detecting text regions in an image. Operations of the flow provide further example embodiments of operation 204 of FIG. 3.

The flow starts at operation 302, where a computing device segments an image into a plurality of regions based on a plurality of color spaces. The use of different color spaces can increase the accuracy of the text region detection by providing a larger and richer set of features across the color spaces for analysis. For example, the used spaces can provide complimentary color channels to compare the features. Example color spaces include RGB, a grayscale, luminance, YCbCr, color gradient magnitude, IHSI gradient, color density, and other color spaces. As such, the computing device can represent the image in each of the plurality of color spaces and can analyze features from these representations to generate regions. Other image processing techniques may be also used, such as Gaussian pyramids as further described herein below. In an embodiment, features from the first representation are analyzed to generate a first set of regions. Likewise, features from the second representation are analyzed to generate a second set of regions. The first set and second set of regions are overlaid over the image. This can result in a large number of regions, some of which may overlap. Further, each of the regions may include text components or non-text components. Thus additional filtering can be implemented to classify the regions between text and non-text regions as further described in the remaining operations of the flow.

To analyze the features in each of the representations, the computing device may implement one or a combination of algorithms configured to group pixels from the representation into regions based on the features. The algorithms include, for example, the stroke width transform (SWT), the stroke feature transform (SFT), the text covariance descriptor (TCD), maximally stable color regions (MSCRs), VLFeat library-based algorithm, and the maximally stable extremal regions (MSERs) algorithms.

In an embodiment, a hierarchical segmentation is implemented. In particular, the computing device generates all candidate regions by extracting regions from three-level Gaussian pyramids in two color spaces using MSER and VLFeat library-based algorithms, where regions can be generated using the MSER algorithm and can be extracted using the VLFeat algorithm. An example MSER algorithm is described in "Matas, J., Chum, O., Urban, M., Pajdla, T.: Robust wide-baseline stereo from maximally stable extremal regions. Image and vision computing 22(10), 2004, 761-767." An example VLFeat algorithm is described in "Vedaldi, A., Fulkerson, B.: Vlfeat: An open and portable library of computer vision algorithms. In: Proceedings of the international conference on Multimedia, A C M, 2010, 1469-1472." Using Gaussian pyramids allows an effective handling of blur and noise in the image that can be suppressed in low pyramid levels. Using Gaussian pyramids also allows a proper handling of different font sizes by generating different versions of segmentation at different resolutions.

The choice of color space for the MSER algorithm can be important. For robustness, grayscale and color gradient magnitude color spaces are used. If only a grayscale space is used, most of text regions in an image (about 90.2%) can be detected. In comparison, by also using color gradient magnitude space, substantially all if not actually all of the text regions in an image can be detected. As such, the color gradient magnitude space provides a complementary source for extracting regions including text regions. For a regular size image, there can be thousands of regions. Thus, additional filtering is implemented to reject non-text regions.

At operation 304, the computing device filters the regions based on a first set of features. The filtering includes classifying the regions between text and non-text regions and discarding the non-text regions. This operation may correspond to a first stage filtering. Because at this point in the flow, there can be a large number of regions that should be filtered, most of which may not be non-text regions, computationally efficient features are used to relatively quickly train a classifier. The classifier can discard most of the non-text regions, resulting in reduced number of regions for further evaluation. These remaining regions may be further filtered in a second stage as further described in operation 306 of the flow.

In an embodiment, five features are used to train a classifier that is able to discard more than 70% of the regions. An example classifier is described in "Bosch, A., Zisserman, A., Munoz., X.: Image classification using random forests and ferns, 2007, ICCV." The five features for a region include an Euler number, a shape descriptor, an aspect ratio, an occupying ration, and a Euclidean distance. The Euler number is defined as the number of connected component minus the number of holes. Since every region is a connected component, the associated Euler number cannot surpass one. The shape descriptor is defined of as $4\pi A/P^2$, where A and P are the area and perimeter of the region, respectively. The aspect ratio can represent the aspect ratio of a bounding box (e.g., a rectangle or some other polygon that bounds the region). The occupying ratio is defined as the area of the region divided by the area of the bounding box. The Euclidean distance corresponds to the Euclidean distance between the average color within the region and that of other pixels inside the bounding box.

These features can be set at a five-dimensional feature vector to train a random forest classifier. The classifier produces a soft confidence value in a range between "0" and "1" for each region. To classify a region, the associated confidence value is compared to a threshold. If larger, the region is classified as a text region; otherwise, the region is classified as a non-text region and is discarded. Because this is a first stage filtering, a small threshold (e.g., "0.1") is used to maintain a high recall at the end of this stage (e.g., to avoid removing false negatives at the expense of keeping a higher number of false positives).

At operation 306, the computing device filters the text regions based on a second set of features to further classify the remaining regions between text and non-text regions. Because at this point in the flow, the number of regions has been greatly reduced (e.g., to 30% in the previous example embodiment), more computationally expensive features for the remaining regions may be used. This filtering may correspond to a second stage. Similarly to the first stage, a multi-dimensional feature vector can be generated for each region and inputted to a classifier. However, this vector typically is of a higher dimension (e.g., includes a larger number of features, some of which may be more complicated to compute than the features used in the first stage). In turn the classifier classifies the regions between text and non-text regions and discards the non-text regions. The classifier can be a random forest classifier similar to the one implemented in the first stage.

In an embodiment, the features of a region include the coordinates of every pixel within the region normalized by the bounding box, the stroke width at each pixel normalized by the smaller value between the width and height of the bounding box, pixel colors in RGB space, and binary layout labels (e.g., pixels lying on an edge of the region are labeled as 1; otherwise 0). For each feature, the values computed from each pixel are concatenated to form vectors. A covariance matrix is built on the above seven vectors (the first and third feature have two and three vectors, respectively). The upright of this matrix is stretched into a 28-dimension feature vector. The five features used in the first stage are also appended to the end of this vector, together with one additional feature—a cover rate. The cover rate is defined as the number of pixels that have stroke width values divided by the total region size. The complete feature vector for a region has, thus, thirty-four dimensions in total. The feature vectors are used to train another random forest classifier to generate a confidence value for each region. The confidence values are compared to a threshold to classify the regions between text and non-text regions. If larger, the region is classified as a text region; otherwise, the region is classified as a non-text region and is discarded. As in the first stage, a small threshold (e.g., "0.1") is used to maintain a high recall.

In a further embodiment, additional filtering stages may be used. In each of the additional stages, another set of features can be used to generate feature vectors for the remaining regions. The feature vectors are used to train a classifier, which generate confidence values for each region. The confidence values can be compared to a threshold to classify the regions in text regions and to discard non-text regions accordingly.

At operation 308, the computing device sets the text regions as candidate text regions for text line extraction. At this point in the flow, the computing device has filtered out non-text regions and classified the remaining regions as text regions. Each of these regions has a confidence value and a number of other features (e.g., color and geometric features). Accordingly, for each text region, the computing device generates a candidate text region characterized based on some or all of the associated features.

In an embodiment, each text region is abstracted into an 8-dimensional feature vector: x coordinate, y coordinate, width, height, stroke width, R, G, B. The x and y coordinates correspond to the center position of the bounding box. The width and height correspond to the size of the bounding box. The stroke width corresponds to the average stroke width of pixels in the region. R, G, B correspond to the average color in the RGB space of the pixels. Each feature vector representing a region can be referred to as a data point.

Because different color spaces were used, there can be overlapping text regions. Thus, the computing device may remove overlapping text regions (or data points) since such regions include duplicate information. To do so, the computing device may implement a non-maximum suppression algorithm. An example of this algorithm is the conventional mean-shift based non-maximum suppression method described in "Dalai, N., Triggs, B.: Histograms of oriented gradients for human detection, 2005, CVPR." In this example, the Epanechnikov kernel can be used in the meanshift process. The meanshift can be expressed as $m(x) = \Sigma_{x_i \in N(x)} w(x_i) x_i / \Sigma_{x_i \in N(x)} w(x_i)$. $x_i$ represents a data point (e.g., a text region) in consideration. $W(x_i)$ represents the weight of the data point. The confidence value computed from the second filtering stage can be used as the weight. $N(x)$ is the local neighborhood of x, which is also known as the bandwidth. Since the text components may vary in size within an image, the bandwidth can be set to be proportional to the size of the region (e.g., the product of the third (width) and fourth (height) element of the data point $x_i$). After removing the overlapping text regions, or the duplicate data points, a candidate text region can be represented as a multi-dimensional vector (or a candidate data point) that includes a data point and the confidence value of that data point.

Hence, by implementing the example flow of FIG. 3, a computing device can generate candidate text regions in an image. Each candidate text region represents a region of the image that contains a text component at a certain confidence value. Further, each candidate text region is characterized by a set of features that can be used in extracting text lines. For example, the features are compared to and matched with features of candidate text lines, which allows finding the best-fitting text lines. As such, the candidate text regions can be inputted into a text line extraction flow such as the one described in FIG. 4.

Figure 5:
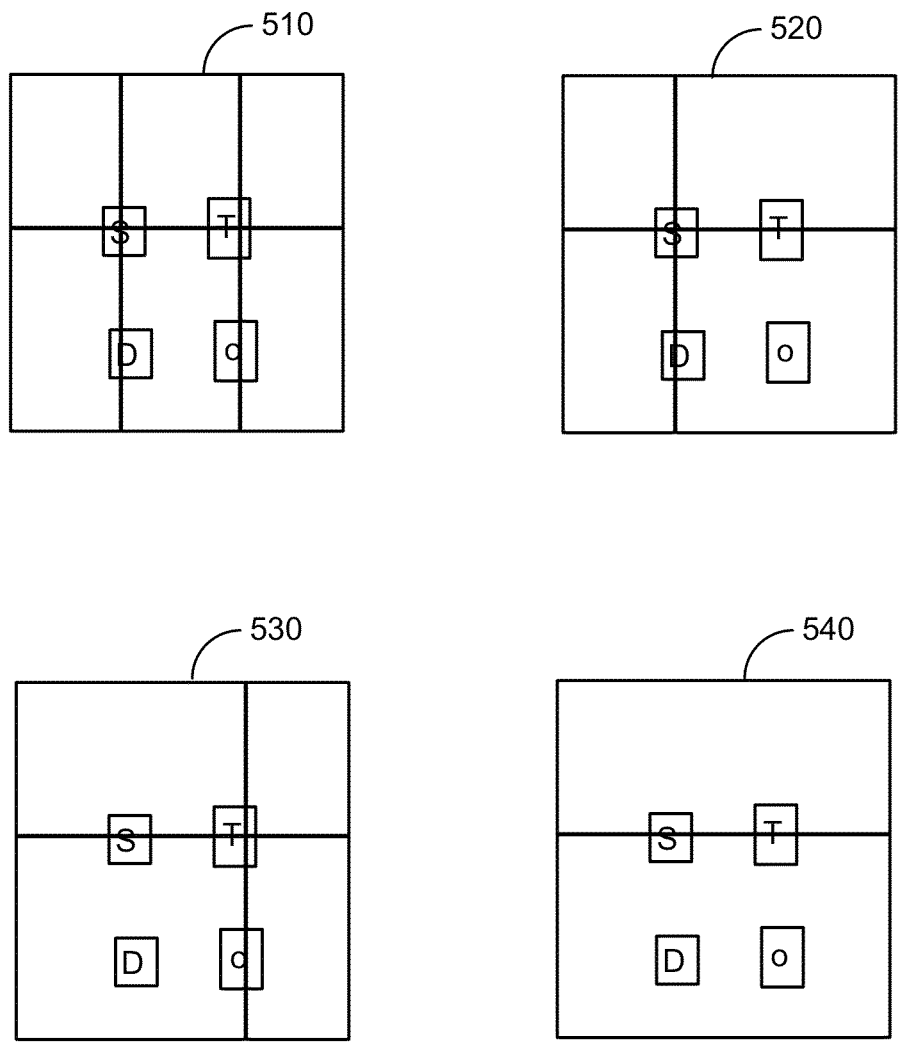
FIG. 5 illustrates an example of selecting text lines, according to certain embodiments of the present invention.

Turning to FIG. 4, that figure illustrates an example process for extracting text lines. In particular a computing device can input candidate text regions to the flow and can output text lines that best fit the candidate text regions. To do so, the computing device considers information, such as various features, about all the candidate text regions and all of possible text lines to select the best fitting text lines. In the interest of clarity of explanation, FIG. 5 illustrates examples of candidate text regions and candidate text lines to describe aspects of the operations of the flow of FIG. 4.

In an embodiment, conventional line fitting approaches, such as using least squares to fit a line from some data points, would not yield to accurate results. That is because the total number of text lines in an image is unknown. Furthermore, there are a large number of outliers, as many background regions may also be included in the input data, and some of them may even have high confidence values (false positives). These regions should not be included in the fitted text lines. Similarly, some true text regions may be assigned with low confidence values (false negatives).

Instead, a multi-model fitting approach can be used, where line fitting can be transferred into a model for minimizing energy. To cope with the unknown number of lines, the approach encourages fewer lines to be extracted. This assumes that text components tend to form fewer long lines rather than many short lines. To handle false positives, a special "outlier" label can be used in the model. Further, the text line fitting takes into consideration not only geometric or spatial properties, but also other features like stroke width and color. As further described in various embodiments of the flow of FIG. 4, the approach includes multiple steps: an initial proposal, an energy minimization, and a re-estimation, where the last two steps are applied iteratively until convergence.

The example flow of FIG. 4 starts at operation 402, where a computing device generates candidate text lines between pairs of candidate text regions. These lines include all possible text lines between candidate text regions. Each candidate text region can belong to one or more candidate text lines. As further described in the remaining operations, the computing device selects the best-fitting text lines from the candidate text lines. The selected text lines represent text lines that best fit the candidate text regions and each candidate text region cannot belong to more than one of the selected text lines.

Further, the computing device can generate a model out of the candidate text lines. The model can include all of these lines and may be referred to as a multi-line model. As further described in the remaining operations, the computing devices inputs the candidate text regions into the model. Next, the computing device compares, matches, updates, and reduces the number of candidate text lines based on this input. The computing device also removes candidate text regions that are not matched to candidate text lines as these regions may represent outlier regions. After a few iterations, the remaining candidate text lines represent text lines that best fit the remaining candidate text regions.

To generate the candidate text lines, the computing device considers pairs of candidate text regions that meet certain constraints. An example constraint includes the distance between the two candidate text regions. If less than a threshold, a candidate text line is generated between the two candidate text regions (e.g., a line that goes through the centers of each region); otherwise, no text line is generated. Another example constraint includes other features of the two candidate text regions. For example, color features (e.g., R, G, B colors, stroke width, or other features) of the two candidate text regions are compared (e.g., a difference is computed). If sufficiently similar (e.g., the difference less than a threshold), the candidate text line is generated; otherwise no text line is generated. The different thresholds can be set based on testing that uses known images with known text lines, such that an optimal value of these thresholds are derived.

Once a candidate text line is generated, the computing device can identify additional candidate text regions that the candidate text line intersects. Further, the computing device can characterize the candidate text line based on various features of the intersecting candidate text regions. For example, the candidate text line can be set as a multi-dimension vector, where elements of the vector include one or more of geometric, color, and confidence features of the candidate text regions. The geometric features can include a slope and coordinate intercepts. The color features can include color values and stroke width. The confidence features can include the confidence values of the candidate text regions.

As illustrated in FIG. 5, snapshot 510 represents an example of candidate text regions and candidate text lines derived from the image 100 of FIG. 1. In this example, acceptable pairs of candidate text regions include the S and T regions, the S and D regions, and the T and o regions. As such, there may be a candidate text line between the S and T regions (e.g., "S-T line"), a candidate text line between the S and D regions (e.g., "S-D line"), and a candidate text line between the T and o regions (e.g., "T-o line").

In an embodiment, candidate text regions are paired using heuristic rules. For each candidate text region, only spatial neighbors within a pre-defined radius are considered. For each pair of candidate text regions, the Euclidean distance is computed between them in the 8-dimensional feature space. If the distance is smaller than a predefined threshold, the line formed by them is set as a candidate text line. The radius can be set as "2.5×scale." The scale is defined as $\sqrt{w \times h}$, where w and h are the average width and height of the bounding boxes of the candidate text regions. The threshold can be set as "0.4." The "2.5×scale" and "0.4" values are example values. Other values can also be used. As described herein above, the values can be set based on testing that uses known images with known text lines.

Mathematically, a candidate text line l is represented as a model of thirteen parameters: $l \sim \{a, b, c, \sigma_{sd}, scale, \sigma_{sc}, stroke\ width, \sigma_{sw}, R, G, B, \sigma_{cl}, confidence\}$.

The first three parameters define a line $ax+by+c=0$, where $a^2+b^2=1$. $\sigma_{sd}$ is the standard deviation of the spatial distances from candidate text regions that belong to the candidate text line. $\sigma_{sc}$ is the standard deviation of the scale, $\sigma_{sw}$ is the standard deviation in stroke width, and $\sigma_{cl}$ is the average standard deviation in three color channels (e.g., R, G, B channels) of all candidate text regions that belong to the candidate text line. Confidence is the average confidence value of the candidate text regions that belong to the candidate text line.

At operation 404, the computing device compares features of a candidate text line to features of a candidate text region. At this operation, the candidate text lines have been generated and the candidate text regions have also been defined. Although the lines were generated based on the regions, at this operation, the computing device can ignore any dependency. Instead, the computing device can consider the candidate text lines and the candidate text regions as two separate datasets and can search for best matches between the datasets. In a way, this matching becomes an assignment problem, where the computing device assigns the candidate text lines to the candidate text regions such that an optimum solution is found. The assignment can be performed along multiple spaces. One space includes features, where the assignment minimizes differences between features of the candidate text lines and features of the candidate text regions. Another space includes the total number of assigned text lines, as further illustrated at operation 410. Briefly, the assignment minimizes the total number of assigned lines. This is under the assumption that that text components tend to form fewer long lines rather than many short line, especially in images of natural scenes.

In an example, the computing device selects a first candidate text line and compares the features of the candidate text line to features of a candidate text region. Next, the computing device selects a second candidate text line and performs a similar comparison. If the two comparisons indicate the first candidate text line is more similar to the candidate text region (e.g., less differences between the features), the first candidate text line is assigned or matched to the candidate text region; otherwise, the second candidate text line is used. This process is repeated for some or all of the candidate text lines across some or all of the candidate text regions to find the best matches.

At operation 406, the computing device assigns the candidate text line to the candidate text region based on the comparison. As described herein above, by comparing the candidate text lines to the candidate text regions, the computing device finds the best matches between the two datasets. As such, if a considered candidate text line is found to have features that best match features of a candidate text region, the computing device assigns that candidate text line to that candidate text region. As further described in the remaining operations of the flow of FIG. 4, the computing device can iteratively compare and assign the candidate text lines. In the initial iteration or after a few iterations, a candidate text region may be matched to more than one candidate text line. However, thereafter (e.g., when a solution converges) a candidate text region should be matched to no more than one candidate text line. Further, some of the candidate text regions may not be matched to any candidate text lines. In this situation, these candidate text regions are considered outliers (e.g., representing false positives) and can be removed.

As illustrated in FIG. 5, snapshot 520 shows the result of comparing features of the three candidate text lines to features of the S region. In this example, the S-T line and S-D line may be more similar to the S region than the T-o line. Thus, either the S-T line or the S-D line, but not the T-o line, can be assigned to the S region. As shown in snapshot 540, after a number of iterations, the computing device can determine that the S-T line is more similar to the S region than the S-D line and, thus, can assign the S-T line to the S region. Similarly, snapshot 530 shows the result of comparing features of the three candidate text lines to features of the T region. In this example, the S-T line and T-o line may be more similar to the T region than the S-D line. Thus, either of the two lines, but not, the S-D line can be assigned to the T region.

At operation 408, the computing device updates the features of the assigned text line based on the feature of the candidate text region. At this operation, a candidate text line has already been assigned to a first candidate text region. As such, the computing device can update the candidate text line (e.g., the vector or the definition of the candidate text line) to include some or all of the features of the first candidate text region. The update allows the information about the candidate text line to be refined, such that in the next iteration, the confidence in the assignment can be increased. The update also allows the computing device to account for similarities or differences between candidate text regions that the candidate text line is assigned to. In other words, after the update, when the computing device compares the candidate text line to a second candidate text region, that comparison would account for the features of the first candidate text region because these features have been added to the features of the candidate text line per the update. Thus, the update considers cross-correlations between the candidate text regions.

The computing device can update features of a candidate text line at various stages of the flow. For example, the computing device can update the candidate text line as soon as the candidate text line is assigned to a candidate text region (e.g., before comparing the candidate text line to another candidate text region). In this case, a faster convergence can be achieved. In another example, the computing device can update the candidate text line only after assigning the candidate text line to the various candidate text regions (e.g., after completing the assignment). In this case, more robustness to local errors in detecting the candidate text regions can be achieved.

Further, the computing device can perform various types of updates. In an example, the computing device may supplement the features of a candidate text line with features of a matched candidate text region(s). In another example, the computing device may not only supplement the features, but may also remove the features associated with a candidate text region(s) to which the candidate text line is no longer assigned to. In yet another example, the computing device may remove and replace previous features of the candidate text line with features of the matched candidate text regions. The update can include re-computing any average, deviation, or other metrics across the features of the candidate text line.

As illustrated in FIG. 5, the snapshots 520 and 530 show a comparison of the candidate text lines to the S and T regions, respectively, without an update. As explained herein above, each of these regions can be assigned to two lines after the first iteration. However, when an update is implemented, additional matching can be achieved. For example, after assigning the S-T line to the S region as shown in snapshot 520, the features of the S-T line can be updated with features of the S region (in this example, assume that this update adds information to the features of the S-T line not previously added). As such, when the S-T line is compared to the T region, the update may provide additional information that can be used in the comparison. For instance, based on this update, the computing device may determine that the S-T line is more similar to the T region than the T-o line. Thus, instead of assigning the S-T and T-o lines to the T region as shown in the snapshot 530, the computing device can assign the S-T line to the T region only as shown in the snapshot 540.

At operation 410, the computing device reduces the total number of the candidate text lines. This operation can facilitate two aspects associated with fitting the candidate text lines with the candidate text regions. First, the computing device can remove unassigned candidate text lines, thereby reducing the total number. As such, after comparing, matching, and assigning the candidate text lines and the candidate text regions as described in the previous operations, there may be candidate text lines that are not assigned to any candidate text region. Thus, those candidate text lines do not represent a good fit and are deleted.

Second, the computing device can remove candidate text lines (assigned or unassigned per the previous operations) as part of finding the best matches. More particularly, the computing device can minimize the total number of assigned text lines. For example, if one solution assigns two candidate text lines to two candidate text regions and another solution assigns one candidate text line to the two candidate text regions, the computing device may select the latter solution as providing a better match because of the reduction in the number of candidate text lines.

To illustrate, consider the snapshots 520, 530, and 540 of FIG. 5. After comparing the candidate text lines to the S and T regions as shown in the snapshots 520 and 530, one solution includes assigning the S-D line to the S region and the T-O line to the T region. However, this solution may not be optimal because it does not result in the minimum number of lines. Instead, another solution includes assigning the S-T line to both the S and T regions. Because this solution represents the minimum number of lines, the computing device may select it over the other solution.

As further illustrated in the example flow of FIG. 4, after performing operation 410, the computing device may iteratively re-perform operations 404-410. As such, after comparing, matching, assigning, updating, and deleting candidate text lines, and removing outliers the computing device can set the resulting features of the assigned text line as a new dataset. Thereafter, the computing device can compare the new dataset to the existing dataset of the features of the candidate text regions (except for the removed outliers) to further fit the remaining candidate text regions with the candidate text regions. This process is iteratively repeated a number of times. Once complete, the computing device can set the assigned candidate text lines as the best-fitting text lines. At that point, the best-fitting text lines are characterized with the features of the candidate text regions that these lines are assigned to.

The number of iterations can be set as the smaller of a solution converges or a predefined number. In an example, a solution converges when each candidate text region is matched to no more than one candidate text line. In another example, a solution converges when a percentage of the candidate text regions is matched to no more than one candidate text line. This percentage can be predefined (e.g., 95% or some other percentage). The predefined number can be derived through testing using, for example, known images with known text lines. Generally, three to five times have been found to be a proper number.

In an embodiment, the computing device generates a set L representing all candidate text lines l under operation 402. As described above, each candidate text line l can be characterized using thirteen parameters derived from features of candidate text regions. After obtaining the initial set L, the computing device treats each candidate text line l as a label. Further, the computing device tries to assign a proper label to each data point (e.g., candidate text region) to produce a line fitting result under operations 404-410. In other words, the initial set L also serves as the initial set of labels.

Next, the computing device can generate a model such as an energy function based on the labels. Minimizing the energy function represents an optimal solution that can be used to determine the best fitting lines. To do so, the computing device implements a Markov Random Field (MRF) regularization framework to estimate the label of every data point (e.g., candidate text region) by optimizing the following energy function:

$$E(L) = \sum_{p \in P} D_p(l_p) + \sum_{l \in L} H(l).$$

P represents the set of data points (e.g., candidate text regions). $l_p \in R^n$ represents the label assigned to a data point p, which corresponds to a line.

The first term in the energy function represents a data cost measuring how well a data point p fits with a line l. In other words, this term measure similarities or differences between a data point p and a line l. The computing device can use this term under operations 404-406. By optimizing this term (e.g., minimizing the total cost of assigning candidate text lines to candidate text regions), two aspects of the optimization can be achieved. First, the differences (e.g., variance between features) between a candidate text line and associated candidate text regions are minimized. Second, differences between the candidate text regions associated with the same candidate text line are also minimized. This cost assignment term can be defined as:

$$D_p(l) = -\ln(G_{sd}(p,l)G_{sc}(p,l)G_{sw}(p,l)G_{cl}(p,l)w(p)).$$

$G_{sd}(p, l)$ measures the geometric error as:

$$G_{sd}(p, l) = \frac{1}{\sqrt{2\pi} \times \sigma}\left(\exp\left(-\frac{(ax_p + by_p + c)^2}{2\sigma_{sd}^2 scale^2}\right)\right).$$

$x_p$ and $y_p$ represent the spatial coordinates of the center of the candidate text region represented by the data point p. It is worth noting that the perpendicular distance from a data point p to a line l is normalized by the scale parameter in order to exclude the influence of the image size. Similarly, $G_{sc}$, $G_{sw}$, and $G_{cl}$ represent normal distributions of parameters scale, stroke width, and RGB color. w(p) represents the confidence value of the data point.

The last term in the energy formula represents a label cost. The computing device can use this label cost to reduce the number of candidate text lines under operation 410. In an example, a fixed per-label cost is used and is defined as:

$$\sum_{l \in L} H(l) = \beta |L|.$$

β represents a constant value (e.g., set at 40 or some other constant value). |L| represents the total number of labels that have been assigned to data points. Thus if a label has no data point that it is being assigned to, the label cost term alone decreases by β. In other words, by using this term in the energy function, the computing device can minimizes the total number of candidate text lines by looking for the smallest possible label cost.

In addition to all the labels that correspond to candidate text lines, the computing device can add a special label to L called "outlier label." The data points receiving this label are the points that are most likely to be false positives (e.g., outlier candidate text regions) and should not belong to assigned text lines. The data cost of these points is a constant set at a fraction of β (e.g., set at 15 or some other fraction). This fraction can be slightly larger than β divided by a desired number of outlier candidate text regions. This is under the assumption that if this number of outlier candidate text regions can fit well within a text line, the computing device should encourage these outlier candidate text regions to form the text line instead of marking them as outliers. For instance, by setting β at 40 and to group three outlier candidate text regions together, the data cost can be set to 15, which is slightly larger than one third of 40. As such, if there are three or more outlier candidate text regions that can fit well with a text line, the computing device can assign them to the text line.

In addition to the data cost and label cost, the energy function can also include a smoothness cost defined as:

$$\sum_{(p,q) \in N} V_{pq}(l_p, l_q).$$

In other words, the energy function can be expressed as:

$$E(L) = \sum_{p \in P} D_p(l_p) + \sum_{l \in L} H(l) + \sum_{(p,q) \in N} V_{pq}(l_p, l_q).$$

The smoothness cost can be expressed as an exponential function on the distance between the data points. Basically, the smoothness cost encourages nearby data points to belong to the same label. However, based on testing, this smoothness cost does not necessarily contribute additional information to the energy function and can be set to zero (e.g., $V_{pq}=0$). That is because data similarity in local neighborhoods is already considered in the initialization step under operation 402. Additionally, a rich set of features is used in the data cost to measure the similarity between a data point and other data points that belong to a text line, so adding a simple spatial smoothness constraint may not help much.

To minimize the energy function under operations 404-410, the computing device can implement, for example, an α-expansion or a greedy method algorithm. Examples of such algorithms are described in "Delong, A., Osokin, A., Isack, H. N., Boykov, Y.: Fast approximate energy minimization with label costs. International journal of computer vision 96(1), 2012, 1-27." Because the smoothness cost is set to zero and because a fixed label cost is used, the problem reduced to an un-capacitated facility location (UFL) problem. Although the α-expansion algorithm can be used, the greedy method algorithm is several times faster and achieves similar results. With the greedy method algorithm, the label set is initially empty, new label are gradually added to the set until the energy value does not decrease with subsequent labels.

After minimizing the energy function under operation 404 and/or operation 410, the computing device assigns each data point (e.g., candidate text region) either to a label corresponding to a candidate text line, or marks the data point as an outlier. Based on the new assignments, the computing device updates the features of the labels and/or the candidate text lines under operation 408. This is in spirit similar to a K-means algorithm, where data assignment and cluster update are applied iteratively. For the first three features (a, b, c) of a candidate text line (or a label), which control the geometric position of the candidate text line, the computing device implements a total least squares (TLS) algorithm to update these features using the positions of the data points that belong to the candidate text line (or assigned to the label). Similarly, other features (e.g., scale, stroke width, R, G, B, the confidence value) can be estimated as the weighted averages of the corresponding features of the data points belonging to the candidate text line (or assigned to the label).

Once the update is complete, the computing device re-minimizes the energy function to re-assign labels to data points. This process iterates until the energy value converges. Finally, computing device groups the data points sharing the same label to generate the best-fitting text lines.

Hence, by implementing the flow of FIG. 4, a computing device can input a set of candidate text regions and output a set of text lines. Each of the text line connects a number of the candidate text regions. Instead of using local information or a graph approach to generate the text lines, the computing device considers global information about the candidate text regions and all possible text lines. Based on this information, the computing device finds the best matches to generate the best-fitting text lines. As such, and as illustrated in FIG. 5, the computing device may initially generate all possible text lines (as shown in the snapshot 510) and iteratively arrive to a best-fitting text line (as shown in the snapshot 540).

Turning to FIG. 6, that figure illustrates an example flow for recognizing text. More particularly, a computing device may perform the flow to analyze text lines and candidate text regions and to, accordingly, extract text.

The example flow starts at operation 602, where a computing device identifies candidate text regions that a text line is assigned to. In other words, the computing device can determine the candidate text regions that belong to each text line. Various techniques may be used. In one technique, the computing device selects a text line and determines which candidate text regions the text line intersects. In another technique, if labels were used in generating the text lines, the computing device can recognize candidate text regions assigned to a same label as belonging to a same text line that corresponds to the label.

At operation 604, the computing devices determines a start and an end of the text line based on coordinates of the text region. This operation represents pruning the text line. As described herein above, as generated in the example flow of FIG. 4, the text line in itself is unbounded. Thus, pruning the text line allows a better approach to recognizing text by limiting the area where text recognition may be applied. In an example, the computing device determines the geometric coordinates of, for instance, centers of the candidate text regions. Based on the coordinates, the computing device determines two candidate text regions that bound the remaining candidate text regions. As such, the computing device sets one of these two candidate text region as the start and the other as the end of the text line. The start and the end may be defined using the coordinates of, for instance, the centers of these candidate text regions.

In an embodiment, the computing device inspects bounding boxes of all candidate text regions assigned to a label of a text line to determine the actual length of the text line. As such, the actual length is the distance between the bounding boxes that represent the end points of the text line. The computing device can generate a final bounding box between the end points to encompass the different candidates.

Further, there is a chance that a background region (e.g., a false positive) is on the text line, but is spatially far away from some true text regions. In this case, the text line may be too long (e.g., the final bounding box too large). To avoid this problem, the computing device also checks the end points to judge whether the two end regions should contribute to the final bounding box of the text line. For example, if the spatial distance between an end point and its neighbor candidate text region is larger than a threshold, the computing device discards that end point from the text line. The threshold can be predefined. For instance, the computing device can set the threshold as four times, or some other number, of the average width of the candidate text regions belonging to the text line. This threshold can also be defined based on testing that uses known images with known text lines and bounding boxes.

At operation 606, the computing device determines distances between adjacent candidate text regions. This operation is part of splitting the text line. For instance, there may be multiple words in the same text line. In this case, if the text line is not split (e.g., broken according to the different words), a text recognition algorithm may erroneously recognize text from these words as a single word. As such, the computing device may implement a splitting algorithm to avoid these types of errors. For example, the computing device determines the average distance and standard deviation between adjacent candidate text regions that belong to a pruned text line (e.g., after removing some end-points as needed). Next, the computing device compares the distance between two adjacent candidate text regions to the average. Based on this comparison, the computing device determines whether to break the text line or not. For instance, if the distance exceeds the average by a certain value, the computing device can decide to break the line. That is because the distance between the two candidate text regions likely corresponds to a space between two different words. This value can be a function of the standard deviation (e.g., twice the standard deviation). In another example, the computing device may not limit the average and standard deviation to one text line. Instead, the computing device may consider similar information across all text lines. This may increase the accuracy of splitting the text line.

In an embodiment, the computing device implements an efficient heuristic method. First, the computing device computes a gradient magnitude map inside the final bounding box of the text line, and projects the gradient magnitude map to the main axis of the text line to form a histogram. Assuming that the intervals between words often have significantly lower gradient magnitude values compared with text components, these intervals are represented as valleys in the histogram. The computing device then detects valleys (e.g., spaces) that are wider than the width of the largest candidate text region and uses the midpoints of the valleys as the splitting points. However, if the midpoint is inside a detected text component, the computing device discards this midpoint to avoid over-segmentation. For the same reason, the computing device does not allow more splitting points than half of the number of the candidate text regions.

At operation 608, the computing device groups a set of the candidate text regions in a group based on the distances. This operation is another part of splitting the text line. As described herein above, if a distance (e.g., a space of a valley) between two adjacent candidate text regions exceeds a value, the computing device determines that the text line should be broken at a point between the two candidate text regions. As such, the computing device breaks the text line into multiple sub-lines based on the distances. The computing device also groups candidate text regions belonging to each sub-line in a group, and may bound the grouped candidate text regions with bounding boxes. Each bounding box may correspond to a word.

At operation 610, the computing device recognizes text in the group of candidate text regions. For example, the computing device may apply an OCR algorithm to candidate text region within a bounding box. The OCR algorithm can recognize the text in the bounding box.

Hence, by implementing the example flow of FIG. 6, a computing device may recognize text based on text lines and candidate text regions. The pruning and splitting approaches may be simple, efficient, and computationally inexpensive to implement.

Figure 7:
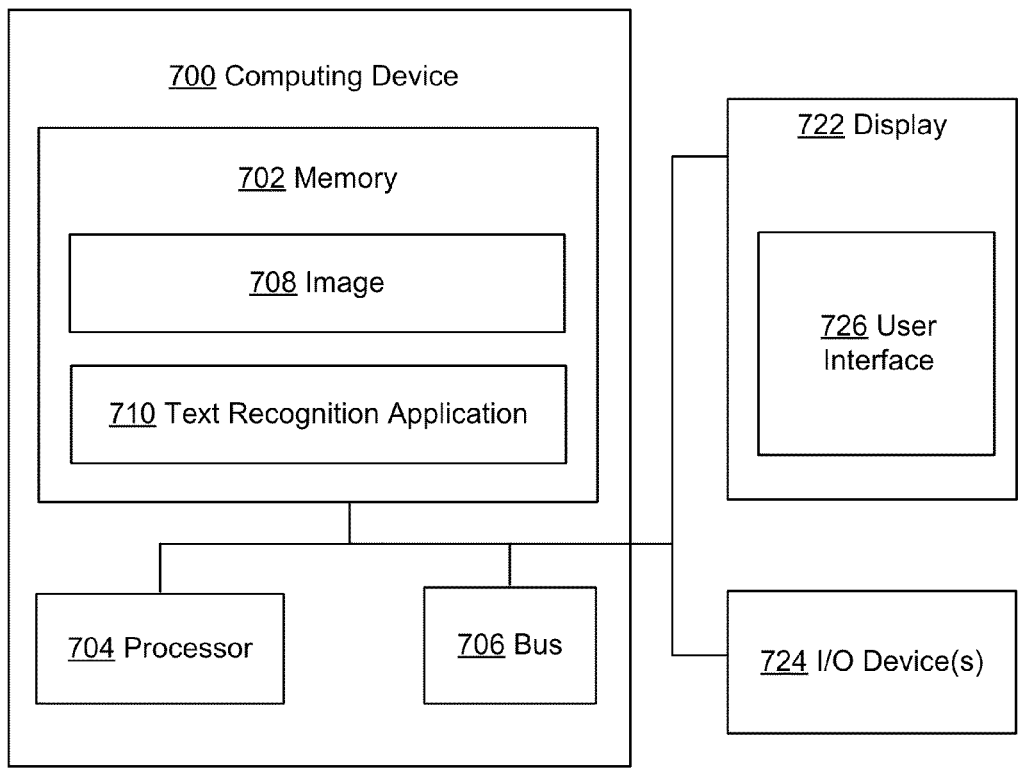
FIG. 7 illustrates an example computing environment for detecting and recognizing text in an image, according to certain embodiments of the present invention.

Turning to FIG. 7, that figure illustrates an example computing device 700 that can be configured to perform the above example flows. In particular, the computing device 700 can analyze an image to detect and recognize text therein. To do so, the computing device 700 can store a module configured to detect text components in an image, a module configured to extract text lines, and a module configured to recognize text based on detected text components and extracted text lines. These modules may be separate or may be integrated in a single module.

As used herein, the term "computing device" refers to any computing or other electronic equipment that executes instructions and includes any type of processor-based equipment that operates an operating system or otherwise executes instructions. A computing device will typically include a processor that executes program instructions and may include external or internal components such as a mouse, a CD-ROM, DVD, a keyboard, a display, or other input or output equipment. Examples of computing devices are personal computers, digital assistants, personal digital assistants, cellular phones, mobile phones, smart phones, pagers, digital tablets, laptop computers, Internet appliances, other processor-based devices, and television viewing devices. The example computing device 700 can be used as special purpose computing devices to provide specific functionality offered by hosted applications and by the interaction between these hosted applications. As an example, the computing device 700 is shown with a display 722 and various input/output devices 724. An example input/output device 724 includes a camera sensor. Another example input/output device 724 includes a receiver or a network interface for receiving information, such as image data, from another computing device in a peer-to-peer configuration or over a network. A bus, such as bus 706 and bus 136, will typically be included in the computing device 700 as well.

In an embodiment, to detect and recognize text from an image, the computing device 700 includes a text recognition application 710. As used herein, the term "application" refers to any program instructions or other functional components that execute on a computing device. An application may reside in the memory of a computing device that executes the application. As is known to one of skill in the art, such applications may reside in any suitable computer-readable medium and execute on any suitable processor. For example, as shown the computing device 700 has a computer-readable medium such as memory 702 coupled to a processor 704 that executes computer-executable program instructions and/or accesses stored information. The processor 704 may include a microprocessor, an ASIC, a state machine, or other processor, and can be any of a number of computer processors. Such processors include, or may be in communication with, a computer-readable medium which stores instructions that, when executed by the processor, cause the processor to perform the operations described herein.

A computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The text recognition application 710 can integrate the three modules described above. As such, the text recognition application 710 analyzes an image 708 by detecting text components in the image 708, extracting text lines, and recognizing text based on the text components and the text lines. In an embodiment, the image 708 is stored in the memory 702 of the computing device 700. In another embodiment, the image 708 may be inserted in a document stored in the memory 702. In an embodiment, the text recognition application 710 may render the image 708. In another embodiment, the text recognition application 710 may interface with another application stored in the memory 702 and configured to render the image 708. For example, the text recognition application 710 can be an application such as ADOBE® ACROBAT®, an image viewer/editor, or some other application that uses image data (e.g., an image-based search engine). In another example, the text recognition application 710 can interface with any of these applications. In yet another embodiment, the text recognition application may interface with an application hosted on a remote computing device, such as a server. This remote application may be configured to detect and recognize text in the image 708, whereas the text recognition application 710 can be configured to provide the image 708 and request the text detection and recognition.

To facilitate interactions with a user, the text recognition application 710 or another application stored in the memory 702 may support a user interface 726. The user interface can be displayed to the user on the display 722 connected to the computing device 700. By operating the I/O devices 714 (e.g., a keyboard and a mouse), the user can request via the user interface 726 a text recognition operation to be applied to the image 708. In turn, the text recognition application 710 performs some or all of the operation described above, recognizes the text, and displays the image 708 with the recognized text at the user interface 716.

Turning to FIG. 8, that figure illustrates an example of an actual image as processed through the embodied techniques described in the flows of FIGS. 3-4 and 6. As illustrated, the image 800 represents a standard image from ICDAR that is used to evaluate performances of text detection and recognition techniques. Image 810 represents the image with the various regions as generated based on the two color spaces. Image 820 represents the image after applying the two stage filtering for filtering out non-text regions. Image 830 represents the image after generating the best-fitting lines. Image 840 represents the image after pruning and splitting the text lines resulting in bounding the text regions and recognizing the words therein.

Turning to FIG. 9, that figure illustrates another set of actual images as processed through the embodied techniques described in the flows of FIGS. 3-4 and 6. These images are also standard images from ICDAR and are used to evaluate performances of text detection and recognition techniques. More particularly, six difficult images are shown. For each image, a first image 910 and a second image 920 are shown. The first image 910 includes the best-fitting text lines, whereas the second image 920 the bounding boxes for the text components resulting from pruning and splitting the text lines.

As shown in these images, the embodied techniques can reliably select proper candidate text components for fitting text lines (e.g., an accurate assignment is achieved), even though the input text components contain a large amount of false positives. This result can be achieved in part because of the outlier label used in the energy function. Furthermore, embodied techniques can reliably handle missing text components, as long as the majority of the text components in a text line have been extracted in the text component detection flow of FIG. 3. The two examples in the bottom row show that embodied techniques can naturally detect text lines in different orientations other than horizontal.

Turning to FIG. 10, that figure illustrates a convergence analysis of the embodied techniques. In particular and as described herein above, the embodied techniques iteratively search for the best-fitting text lines. Thus, it may be important to determine the number of iterations until a solution converges. Plot 1010 illustrates an example of this analysis by plotting the energy function against the number of iterations. Plot 1020 illustrates another example of this analysis by plotting the percentage of label change against the number of iterations. To generate these plots, all 233 images in the ICDAR 2013 datasets were used. The plots show that both the total energy and the percentage of label change drop rapidly in the first few iterations, and become stable after five iterations. Especially, after five iterations the labels of data points do not change anymore. Thus, the stop criteria (e.g., the number of iterations until a solution converges) can be set as the percentage of label changes. If this percentage is below a small threshold (e.g., 1%), no further iterations are needed.

Furthermore, the embodied techniques were evaluated using the public ICDAR 2011 and ICDAR 2013 datasets (robust reading competition challenge 2: reading text in scene images, task 1: text localization, as described in "Shahab, A., Shafait, F., Dengel, A.: Icdar 2011 robust reading competition challenge 2: Reading text in scene images, 2011, ICDAR" and "Karatzas, D., Shafait, F., Uchida, S., Iwamura, M., Gomez, L., Robles, S., Mas, J., Fernandez, D., Almazan, J., de las Heras, L.: Icdar 2013 robust reading competition, 2013, ICDAR"). The ICDAR 2011 dataset contains 229 images for training and 255 images for testing. The ICDAR 2013 dataset has the same training images, but the test set contains 233 images, and is a subset of ICDAR 2011 set. All images capture natural scenes and the image sizes vary from 422×102 to 3888×2592. In particular, the images in the training set of ICDAR 2013 are annotated with pixel-level ground truth.

To train the two stage classifiers for component detection, the training set of ICDAR 2013 was used as individual letters from the pixel-level ground truth and can be extracted as the positive samples. The negative samples were obtained from the regions extracted by MSER that do not intersect with any ground truth bounding box. The classifier in the first filtering state has 30 trees while the one in second filtering state has 50 trees. The thresholds in both classifiers are set to be a low value at "0.1," in order to keep a high recall at the component level.

The performance of the embodied techniques is measured by recall (R), precision (P) and F-measure (F) quantitatively. As to the definition of R, P and F, though the test sets of these two benchmarks are similar, their evaluation schemes differ from each other. ICDAR 2011 competition uses the evaluation method described in "Wolf, C., Jolion, J. M.: Object count/area graphs for the evaluation of object detection and segmentation algorithms. International Journal on Document Analysis and Recognition 8(4), 2006, 280-296." This method punishes "many-to-one" and "one-to-many" matches with a factor of "0.8." The embodied techniques fall into the "many-to-one" case, because one text line can contain multiple words. Thus, the text line splitting method described under the flow of FIG. 6 is applied to produce word level detection for evaluation. The ICDAR 2013 competition uses roughly the same evaluation method with two major changes: (1) it does not apply any penalty on "many-to-one" matches; and (2) it introduces the "do not care" regions that contain tiny and subtle texts. While in theory results could be fed in the embodied text line detection for evaluation as the "many-to-one" penalty is removed, in practice the official ICDAR implementation sometimes cannot correctly detect "many-to-one" cases, and misclassifies many text lines as "one-to-one" matching with one of the words in them, leading to large detection errors. Thus, the embodied text line splitting method is applied for evaluating on this dataset.

The complete evaluation results are shown in tables 1 and 2, along with the results of existing top-ranking methods. On ICDAR 2011 dataset, the embodied techniques achieve the highest recall and F-measure among all the reported methods. On ICDAR 2013 dataset, the embodied techniques achieve the highest recall and the second best F-measure. Note that the embodied techniques involve a heuristic text line splitting step for evaluation, which may introduce additional errors. However, if the official implementation of the evaluation method for the ICDAR 2013 competition can be fixed to properly handle text lines, the embodied techniques can have higher scores. To verify this, the text line results are evaluated without line splitting using the modified ICDAR 2011 evaluation implementation by removing the penalty factor of "0.8." This result is shown as "Our*" in table 2, which is significantly better than the other word level result and that of any other methods.

Tables 1 and 2 are listed herein below.

TABLE 1

Results on the ICDAR 2011 dataset (%).

| Technique | Recall | Precision | F-Measure |
|---|---|---|---|
| The embodied techniques | 71.77 | 81.69 | 76.41 |
| Kim's | 62.47 | 82.98 | 71.28 |
| Yi's | 58.09 | 67.22 | 62.32 |
| TH-Text Loc | 57.68 | 66.97 | 61.98 |
| Neumann's | 52.54 | 68.93 | 59.63 |
| CD + CP | 66.14 | 31.59 | 42.76 |

TABLE 2

Results on the ICDAR 2013 dataset (%).

| Technique | Recall | Precision | F-Measure |
|---|---|---|---|
| The embodied techniques | 69.17 | 82.1 | 75.09 |
| Our* | 72.49 | 82.68 | 77.25 |
| USTB | 66.45 | 88.47 | 75.89 |
| TextSpotter | 64.84 | 87.51 | 74.49 |
| UMD | 62.26 | 89.17 | 73.33 |
| CASIA | 68.24 | 78.89 | 73.18 |
| CD + CP | 70.45 | 29.04 | 41.13 |

In order to better evaluate the text line extraction component, which is the core contribution of this work, a baseline method called "CD+CP" was tested. This method replaces the text line extraction method using the heuristic component pairing approach as described in "Epshtein, B., Ofek, E., Wexler, Y.: Detecting text in natural scenes with stroke width transform, 2010, CVPR." The significant performance difference between "CD+CP" and the embodied techniques, as shown in tables 1 and 2, suggests that the embodied text line fitting approach can produce much higher quality results than heuristic methods from the same input data. The high recall of both methods demonstrates that the embodied component detection method can maintain a high recall, but also introduce false positives and duplicates, which are challenging for line fitting methods to handle properly. While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method comprising:
   detecting, by a processor, text components in an image, each of the text components comprising a different respective portion of the image identified as likely containing text;

generating, by the processor, text lines between pairs of the text components;

matching, by the processor, a first text line of the text lines with a set of the text components based on features of the text components of the set and based on reducing a total number of matched text lines; and recognizing, by the processor, text from the set of the text components based on the first text line.

2. The computer-implemented method of claim 1, wherein generating text lines comprises:

selecting a first text component;

identifying a second text component based on a distance to the first text component;

comparing features of the first text component and features of the second text component; and generating a text line between the first text component and the second text component based on the comparison.

3. The computer-implemented method of claim 1, wherein generating text lines comprises generating a text line between a pair of text components based on coordinates of the pair of text components.

4. The computer-implemented method of claim 1, wherein generating text lines comprises:

identifying a pair of text components;

generating a text line between the pair of text components;

identifying a third text component that the text line intersects; and setting features of the text line to account for the third text component.

5. The computer-implemented method of claim 1, wherein generating text lines comprises identifying a pair of text components based on color properties, geometric properties, or stroke width of text components in the pair.

6. The computer-implemented method of claim 1, wherein generating text lines comprises setting features of a text line to account for features of intersecting text components, and wherein matching the first text line with the set of the text components comprises:

selecting a text component;

determining differences between features of the text component and features of the text lines; and assigning the first text line to the text component based on a determination that a difference between the features of the text component and the features of the first text line is the smallest difference among the differences.

7. The computer-implemented method of claim 1, wherein matching the first text line with the set of the text components comprises:

assigning a first set of text lines to the text components;

assigning a second set of text lines to the text components;

determining that a total number of text lines in the first set is smaller than a total number of text lines in the second set; and selecting the first set of text lines as the matched lines, wherein the first text line is a text line of the first set of lines.

8. The computer-implemented method of claim 1, wherein matching the first text line with the set of the text components comprises:

generating labels for the text lines, wherein each label for each text line comprises features of text components intersecting with the text line;

iteratively assigning labels to the text components based on minimizing a cost assignment, wherein:

the cost assignment comprises a text component cost and a label cost, the text component cost compares features of the text components and features of the labels, the label cost measures a total number of labels that are assigned to text components, the iterative assignment comprises updating features of the assigned labels and removing unassigned labels, and the updated features of the assigned labels comprise features of corresponding text components to which the labels are assigned; and setting the first text line based on the assigned labels.

9. The computer-implemented method of claim 1, wherein matching the first text line with the set of the text components comprises:

generating labels based on the text lines;

generating an outlier label;

assigning the outlier label to a text component based on a determination that a text component cost of assigning a label from the labels to the text component is over a threshold; and identifying, for a matched line that intersects with the text component, that the text component is an outlier based on the assignment of the outlier label.

10. A system comprising:

a processor;

a memory communicatively coupled to the processor and bearing instructions that, upon execution by the processor, cause the system to at least:

segment a portion of an image into regions;

select candidate text regions from the regions based on likelihoods of comprising text components;

generate text lines between pairs of candidate text regions;

assign a set of the text lines to a set of the candidate text regions, wherein the assignment is based on features of the candidate text regions, and wherein the assignment reduces a total number of the text lines; and generate a bounding box for a portion of text in the image based on the set of the text lines, the bounding box facilitating recognition of text in the image.

11. The system of claim 10, wherein segmenting a portion of the image into regions comprises:

generate a first representation of the portion in a first color space;

analyze properties of the first representation to generate first regions;

generate a second representation of the portion in a second color space;

analyze properties of the second representation to generate second regions; and overlay the first regions and the second regions on the portion of the image to generate the regions.

12. The system of claim 10, wherein segmenting a portion of the image into regions comprises generating representations of the portion of the image in color spaces, wherein a first representation comprises a grayscale representation of the portion of the image, and wherein a second representation comprises a color gradient magnitude representation of the portion of the image.

13. The system of claim 10, wherein selecting candidate text regions from the regions comprises:

filter the regions through a multiple stage filter; and classify the filtered regions in candidate text regions and candidate non-text regions.

14. The system of claim 10, wherein selecting candidate text regions from the regions comprises filter the regions through a filter that comprises a first stage and a second stage, wherein the regions are filtered in the first stage based on a first set of features of the regions, wherein remaining regions are filtered in the second stage based on a second set of features of the remaining regions, and wherein the second set of features is more computationally expensive than the first set of features.

15. The system of claim 10, wherein assigning a set of text lines to a set of candidate text regions comprises:
generate a model for assigning the set of the text lines to the set of the candidate text regions, wherein the model is configured to input all possible assignments of the text lines to the candidate text regions across the portion of the image, and wherein the model is configured to output the text lines based on features of the text lines and the features of the candidate text regions and based on reducing the size of the set of the text lines.

16. The system of claim 10, wherein assigning a set of text lines to a set of candidate text regions comprises generate a model for assigning the set of the text lines to the set of the candidate text regions, wherein the model is configured to:
select a first text line;
measure first differences between features of the first text line and features of a text component;
select a second text line;
measure second differences between features of the second line and features of the text component;
assign the first text line to the text component based on a determination that the first differences are smaller than the second differences; and
remove the second text line.

17. A non-transitory computer-readable storage medium storing instructions that, when executed on a computing device, configure the computing device to perform operations comprising:
detecting candidate text regions in an image;
generating candidate text lines between pairs of the candidate text regions;
selecting text lines from the candidate text lines based on an assignment of the candidate text lines to the candidate text regions, wherein the assignment is based on features of the candidate text regions and minimizes a total number of the selected text lines; and generating a bounding box for a portion of text in the image based on the selected text lines, the bounding box facilitating recognition of text in the image.

18. The non-transitory computer-readable storage medium of claim 17, wherein generating a bounding box for a portion of text comprises:
identifying candidate text regions that a selected text line intersects;
determining a start and an end of the selected text line based on coordinates of the identified candidate text regions;
determining distances between adjacent candidate regions based on the coordinates; and
grouping a subset of the identified candidate text regions in one group based on the distances, wherein the bounding box bound the group to indicate a word that the subset represents.

19. The non-transitory computer-readable storage medium of claim 17, wherein selecting text lines from the candidate text lines comprises:
identifying candidate text regions that a candidate text line intersects;
generating a label representative of the candidate text line based on features of the identified candidate text regions, the label comprising color and geometric features of the identified candidate text regions;
measuring differences between features of the label and features of a candidate text region;
assigning the label to the candidate text region based on a determination that the differences are smaller than differences associated with assigning another label to the candidate text region;
updating the assigned label to include features of the candidate text region;
determining that another other label representative of another candidate text line is unassigned to other candidate text regions; and
deleting the other label, and
wherein the selected text lines correspond to assigned labels, and wherein a selected text line is defined based on features of a corresponding assigned label.

* * * * *